Oct. 21, 1924.

E. T. FERNGREN 1,512,412

GLASS CUTTING APPARATUS

Filed April 6, 1922  2 Sheets-Sheet 1

INVENTOR
Enoch T. Ferngren
By J. F. Rule
His Attorney

Oct. 21, 1924.  1,512,412

E. T. FERNGREN

GLASS CUTTING APPARATUS

Filed April 6, 1922  2 Sheets-Sheet 2

INVENTOR
ENOCH T. FERNGREN
BY
HIS ATTORNEY

Patented Oct. 21, 1924.                                                          1,512,412

UNITED STATES PATENT OFFICE.

ENOCH T. FERNGREN, OF TOLEDO, OHIO, ASSIGNOR TO THE OWENS BOTTLE COMPANY, OF TOLEDO, OHIO, A CORPORATION OF OHIO.

GLASS-CUTTING APPARATUS.

Application filed April 6, 1922. Serial No. 549,999.

*To all whom it may concern:*

Be it known that I, ENOCH T. FERNGREN, a citizen of Sweden, residing at Toledo, in the county of Lucas and State of Ohio, have invented new and useful Improvements in Glass-Cutting Apparatus, of which the following is a specification.

My invention relates to cutting apparatus for use in connection with automatic glass feeders. It is herein shown in connection with a glass feeder of the type in which the glass issues through an orifice in the bottom of a container, the discharge of glass being controlled by a plug or regulator which is periodically reciprocated vertically over the outlet to cause the glass to be expelled in the form of suspended masses or gobs which are severed at a point a short distance below the outlet.

An object of the invention is to provide cutters which as they engage the glass will move it by their angle of penetration and displacement in a downward direction, this downward movement continuing also during the severing of the glass, thereby avoiding the arresting of the downward movement of the glass at or adjacent the cutting point.

A further object of the invention is to provide cutting means by which the gob or charge is severed from the issuing glass without pushing the upper end of the severed charge over to one side or out of line with the rest of the charge and without causing a tension or stretching of the upper end of the charge before the severance is completed.

A feature of the invention consists in providing a pair of shears or cutter blades which during the severance of the charge, simultaneously, uniformly and equally bear or thrust down upon the upper end of the charge that is being cut.

A further feature of the invention consists in providing improved cutting means which during the severance of a charge, reduce the diameter of the glass immediately above the cutters, or in other words, produce a tapered form to the cut surface of the stub remaining after the gob is severed.

The invention further consists in the arrangement and operation of the cutter blades in oppositely inclined planes, the cutters being arranged at substantially equal angles to the horizontal as they penetrate the glass, whereby displacement is equalized.

A further object of the invention is to impart a downward velocity to the upper end of the mold charge equal to or greater than that attained by the lower end of the charge at the instant the severance is completed, thereby avoiding or reducing to a minimum the tendency of the upper end of the charge to be thrown to one side as the gob enters the mold into which it drops.

Other objects of the invention will appear hereinafter.

Figure 1:
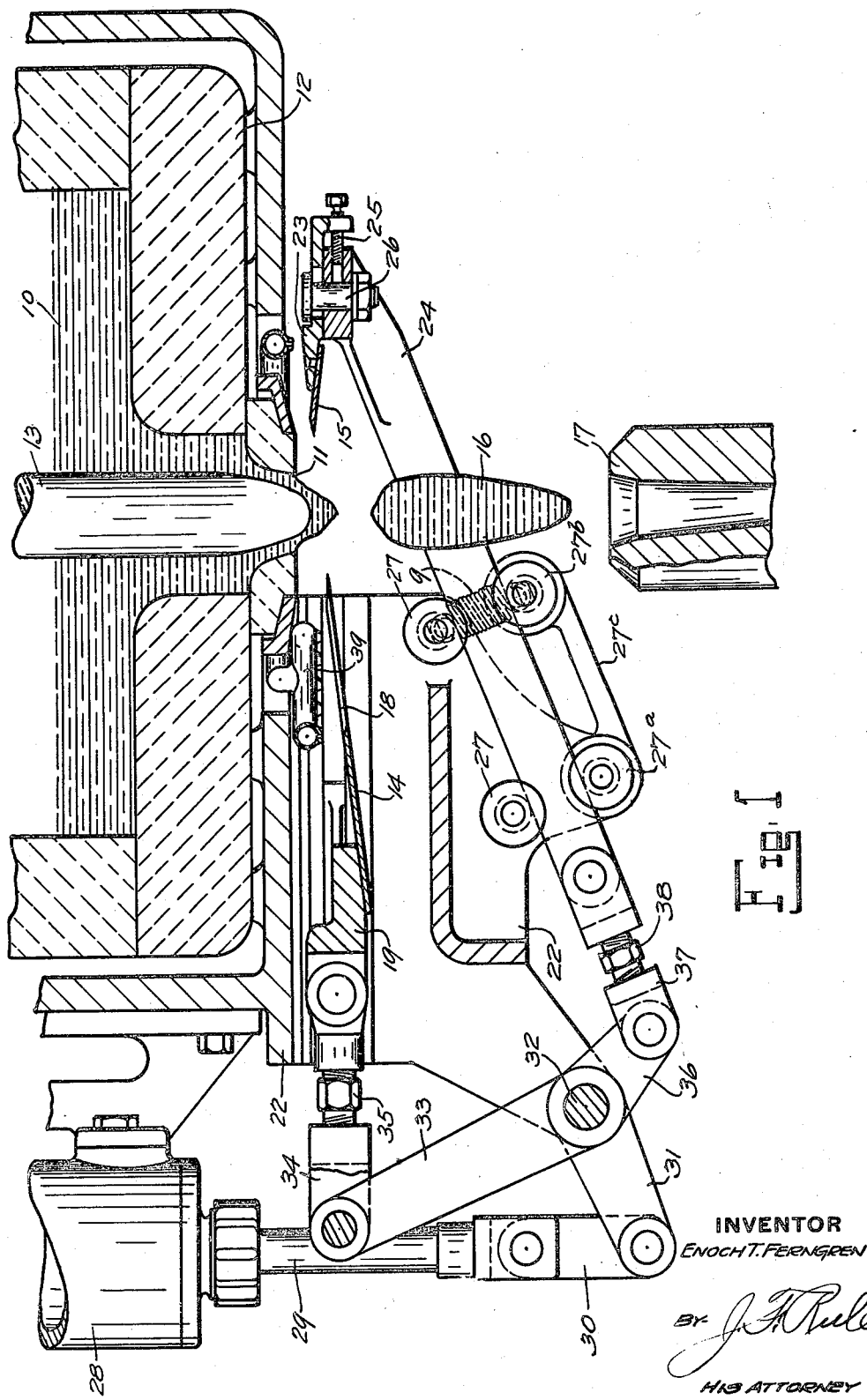
Figure 1 is a sectional elevation of apparatus constructed in accordance with my invention.
Figure 2:
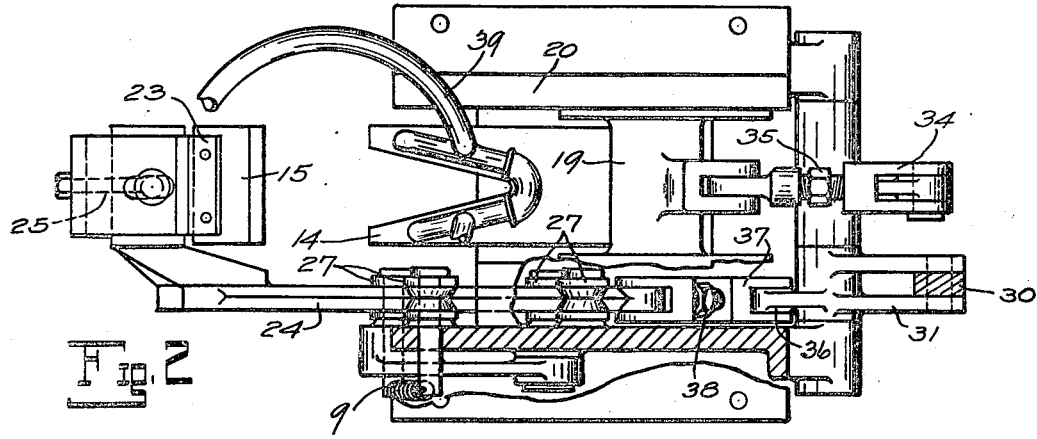
Figure 2 is a part sectional plan view of such apparatus, the glass container being omitted.

The molten glass 10 issues through an outlet orifice 11 in the bottom of a container 12, the discharge of glass being automatically controlled in a well known manner by a clay plug or regulator 13 which is periodically reciprocated vertically over the outlet. As the plug descends, it exerts an expelling force on the glass which issues in the form of a suspended mass or gob 16 which is then severed by a pair of cutter blades 14 and 15. The severed gob 16 drops into a forming mold 17. The blade 14 has tapered cutting edges 18 forming a V-shaped cutter. This blade is carried by a block 19 mounted to reciprocate in horizontal guideways 20 provided in a supporting frame 22. The blade 15 is mounted on a supporting block or plate 23 carried by a bar 24. The plate 23 may be adjusted horizontally on the bar 24 by means of an adjusting screw 25, and is held in adjusted position by a clamping bolt 26. The bar 24 is inclined to the horizontal and is mounted for reciprocating movement in the direction of its length on the frame 22. The bar is supported and guided by upper rolls 27 on said frame, and lower rolls 27ᵃ and 27ᵇ. The roll 27ᵇ is carried by an arm 27ᶜ fulcrumed on the spindle of the roll 27ª. A spring 9 holds the roll 27ᵇ against the bar 24. The cutters are actuated by an air motor 28, the piston rod 29 of which is connected through a link 30 to a rock arm 31 on a horizontal rock shaft 32. A rock arm 33 on the shaft 32 is connected through a link 34 to the block 19. The link 34 may comprise a turn-buckle or adjusting screw 35 for adjusting the blade 14 in a horizontal direction. A rock arm 36 on the shaft 32 is connected through a link 37 with the bar 24. The link 37 may also be provided with an adjusting screw 38. A pipe 39 extends over the cutter blades and is provided with perforations or nozzles through which a cooling fluid, such as water or air, may be directed against the blades to prevent overheating.

Figures 3, 4:
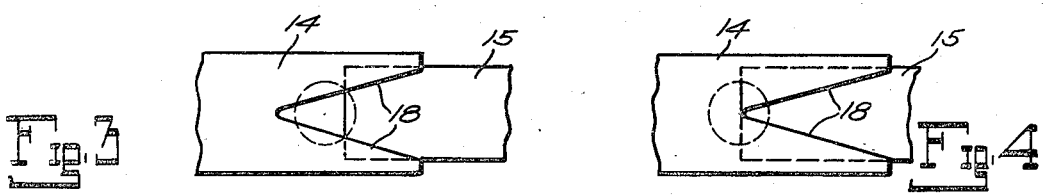
Figures 3 and 4 are diagrammatic views of the cutters at different positions during a cutting stroke.
Figures 5, 6:
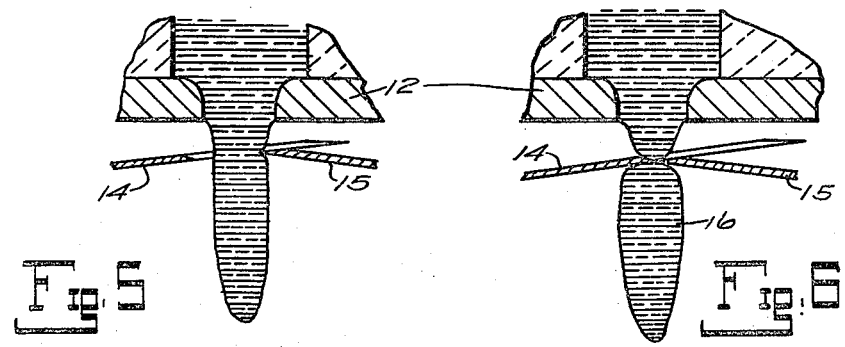
Figures 5 and 6 are sectional elevations showing the issuing glass and showing the cutters in the positions shown in Figures 3 and 4 respectively.
Figure 7:
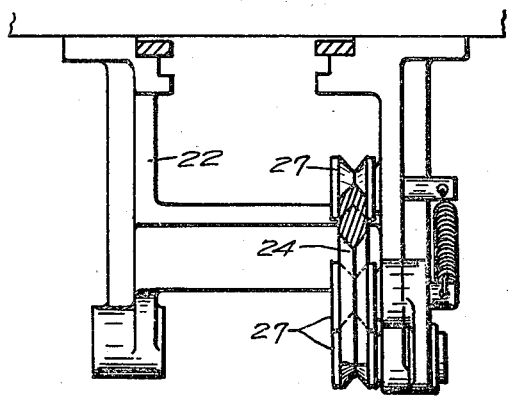
Figure 7 is a sectional elevation of mechanism shown in Figure 2.

The cutter blade 14, as shown, is mounted in an inclined position, but arranged to move horizontally. The blade 15 is also inclined to the horizontal, the angles of inclination of the blades 14 and 15 being preferably equal. The blade 15, however, instead of reciprocating horizontally, moves in a slanting direction during the cutting stroke. As the piston rod 29 moves upward, the shaft 32 is rocked and operates through the arm 33 to advance the blade 14 with a comparatively rapid movement. At the same time the blade 15 is advanced, but with a much slower movement owing to the rock arm 36 being much shorter than the arm 33. As the blades approach the suspended gob of glass, the ends overlap and assume the glass gripping position shown in Figures 3 and 5. It will be noted that at this position the blade 15 is beneath the blade 14 and in shearing relation thereto. The blade 15 is moving downward as well as forward, owing to the inclined direction of movement of its carrier bar 24. The inclination of the blade 14, the inclination of the bar 24 and the relative speed of the blades 14 and 15 are all so related and co-ordinated that the blades maintain their shearing contact throughout the cutting stroke. It will be seen that while the cutting is taking place there is brought about an equalized displacement in a manner to give a concentric movement in a downward direction to the glass of the upper end of the charge at its points of contact with the cutting edges and lower knife surfaces. This downward movement of the glass as regards the blade 14 is due to the fact that the gripping point of the V-shaped cutting edge because of its inclination, as it penetrates the glass during the horizontal movement of the blade, brings down that cross section of the glass which is below the blade; whereas the downward movement of the glass caused by the blade 15 is due in part to its inclined position and in part to the downwardly inclined direction of movement of the carrier 24. The downward impetus of this displacement is preferably equal to or greater than that of the glass at the severing point when the severance commences, so that the glass above the blades is not supported by the blades during such severance. The speed of the blades during the severance may be such as to cause them to impart a downward thrust to the gob 16 as it is severed. The downward movement of the blades during severance forms a more or less tapered or pointed end on the stub of glass remaining after a gob has been severed. At the instant the severance of a gob is completed the cutters are substantially in the position shown in Figures 4 and 6 in which the forward edge of the blade 15 and the inner end or apex of the inclined cutting edge 18 are substantially at the vertical axis of the gob. The action of the cutters is such as to eliminate or reduce to such an extent as to be negligible, the tendency of cutters to throw the upper end of the severed gob to one side. The somewhat greater tendency of the lower blade 15, owing to its position, to thrust the end of the gob sidewise is counteracted by the higher speed of the blade 14. The inclination of the blades also operates to counteract or oppose any tendency to bend or throw the gob out of its vertical line of descent.

The downward movement given to the glass of the upper end of the mold charge by the cutting wedges during the severance of the glass may be increased, if desired, by mounting the cutter supporting frame for vertical downward movement during the cutting stroke, in which case the transit velocity of all portions of the glass composing each mold charge will be unified and speeded, thereby enabling its delivery into a transversely moving mold without any side fling of the upper end of the charge at the entrance to the mold cavity.

Modifications may be resorted to within the spirit and scope of my invention.

What I claim is:

1. In apparatus for delivering charges of molten glass, the combination of a container for the glass having an outlet opening, cutters beneath and at opposite sides of said opening, and means to simultaneously advance said cutters, one in a horizontal direction and the other in a downwardly inclined direction, and cause them to meet in severing relation beneath said outlet.

2. In apparatus for delivering charges of molten glass, the combination of a container for the glass having an outlet opening, cutters beneath and at opposite sides of said opening, and means to simultaneously advance said cutters, one in a horizontal direction and the other in a downwardly inclined direction, and cause them to meet in severing relation beneath said outlet, said horizontally moving cutter being in a plane inclined to its direction of movement.

3. In apparatus for delivering charges of molten glass, the combination of a container for the glass having an outlet opening, cutters beneath and at opposite sides of said opening, and means to simultaneously advance said cutters, one in a horizontal direction and the other in a downwardly inclined direction, and cause them to meet in severing relation beneath said outlet, said cutters being upwardly inclined with respect to their direction of movement.

4. In glass feeding apparatus, the combination of cutter blades arranged to approach a cutting position from opposite directions, one of said blades being upwardly inclined with respect to its said direction of approach, and the approach of the other blade being in a downwardly inclined direction.

5. In glass feeding apparatus, the combination of cutter blades arranged to approach a cutting position from opposite directions, means to move one blade horizontally, and means to move the second blade in a downwardly inclined direction as the blades approach.

6. In glass feeding apparatus, the combination of cutter blades arranged to approach a cutting position from opposite directions, means to move one blade horizontally, and means to move the second blade in a downwardly inclined direction as the blades approach, the horizontally moving blade being inclined to its direction of movement, the angle of inclination of said second blade being greater than the inclination of the horizontally moving blade, and the movement of the latter more rapid than that of the other blade.

7. In glass severing apparatus, the combination of shear blades arranged to approach from opposite directions, one of said blades having a V-shaped reentrant angle forming its cutting edge, the other blade having its edge substantially perpendicular to its direction of movement.

8. In glass severing apparatus, the combination of shear blades arranged to approach from opposite directions, one of said blades having a V-shaped reentrant angle forming its cutting edge, the other blade having its edge substantially perpendicular to its direction of movement, and means to move the first mentioned blade at a substantially greater velocity than the second during the cutting stroke.

9. In glass severing apparatus, the combination of shear blades arranged to approach from opposite directions, one of said blades having a V-shaped reentrant angle forming its cutting edge, the other blade having its edge substantially perpendicular to its direction of movement, said blades being upwardly inclined with respect to their direction of advance.

10. In glass feeding apparatus, the combination of a container for molten glass having an outlet opening in the bottom thereof, cutters arranged beneath and at opposite sides of said opening, one of said cutters mounted to reciprocate horizontally, and consisting of a flat blade having a V-shaped notch forming a cutting edge, said blade being forwardly and upwardly inclined, and a carrier for the other blade mounted to reciprocate in an inclined direction by which it is moved downward as it advances.

11. In glass feeding apparatus, the combination of a container for molten glass having an outlet opening in the bottom thereof, cutters arranged beneath and at opposite sides of said opening, one of said cutters mounted to reciprocate horizontally, and consisting of a flat blade having a V-shaped notch forming a cutting edge, said blade being forwardly and upwardly inclined, a carrier for the other blade mounted to reciprocate in an inclined direction by which it is moved downward as it advances, and means to actuate said blades and cause the first mentioned blade to advance more rapidly than the second blade, the downward inclination of the direction of movement of the second blade being greater than the inclination of the first mentioned blade to compensate for the relatively rapid movement of the first mentioned blade.

12. The combination of flat shear blades, means to cause them to approach in directions forming an obtuse angle, one of said blades being inclined at such an angle to its direction of movement that the other blade can slide thereover to produce a shear cut, and means to direct the blades and cause them each to move in a straight line throughout their cutting movement.

13. The combination of flat shear blades, means to cause them to approach and meet in shearing relation, one blade being upwardly and forwardly inclined with respect to its direction of movement, the other blade being oppositely inclined with respect to said direction of movement, and means to direct the blades and cause them each to move in a straight line throughout their cutting movement.

14. The combination of flat shear blades, means to cause them to approach and meet in shearing relation, said blades both being inclined to the direction of movement of one of the blades, one of said blades having its shearing edge at an acute angle to its direction of movement and arranged to shear across the shearing edge of the other blade.

Signed at Toledo, in the county of Lucas and State of Ohio, this 3rd day of April, 1922.

ENOCH T. FERNGREN.